July 4, 1950
E. B. KELLY
2,514,075
ARTIFICIAL TOOTH
Filed July 10, 1940
2 Sheets-Sheet 1
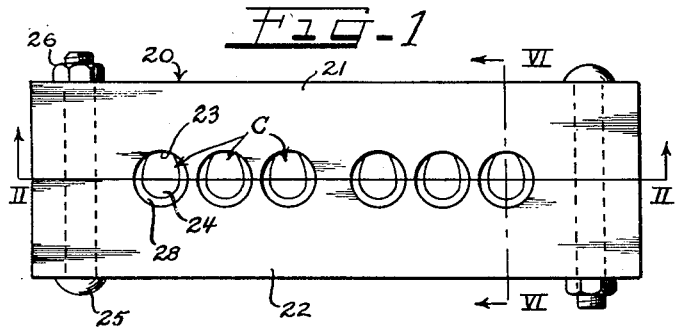
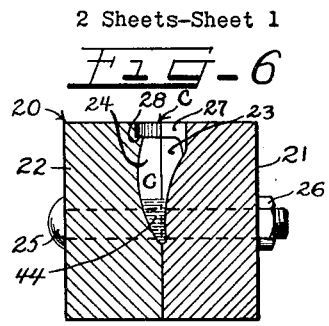
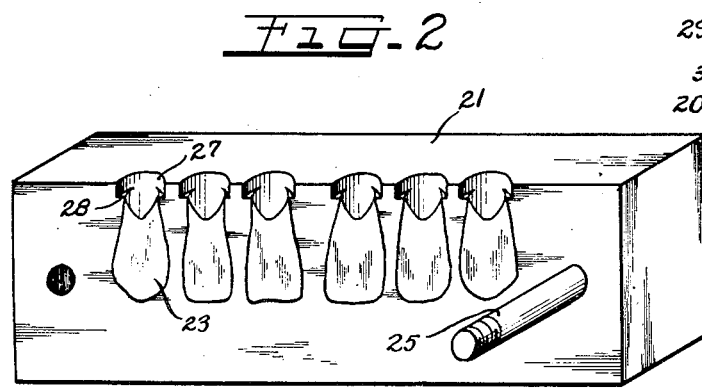
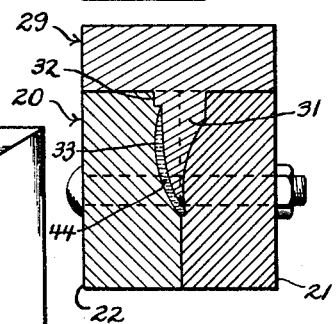
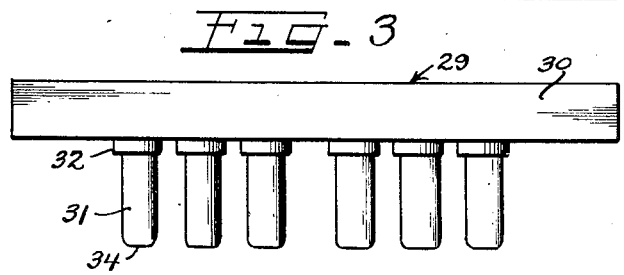
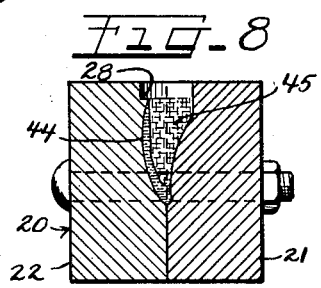
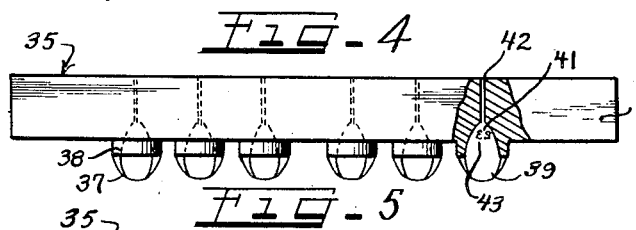
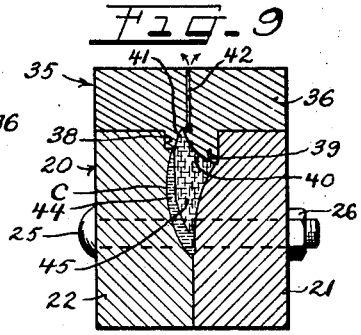
Inventor
Ernest Byron Kelly
by Charles O'Neill Attys

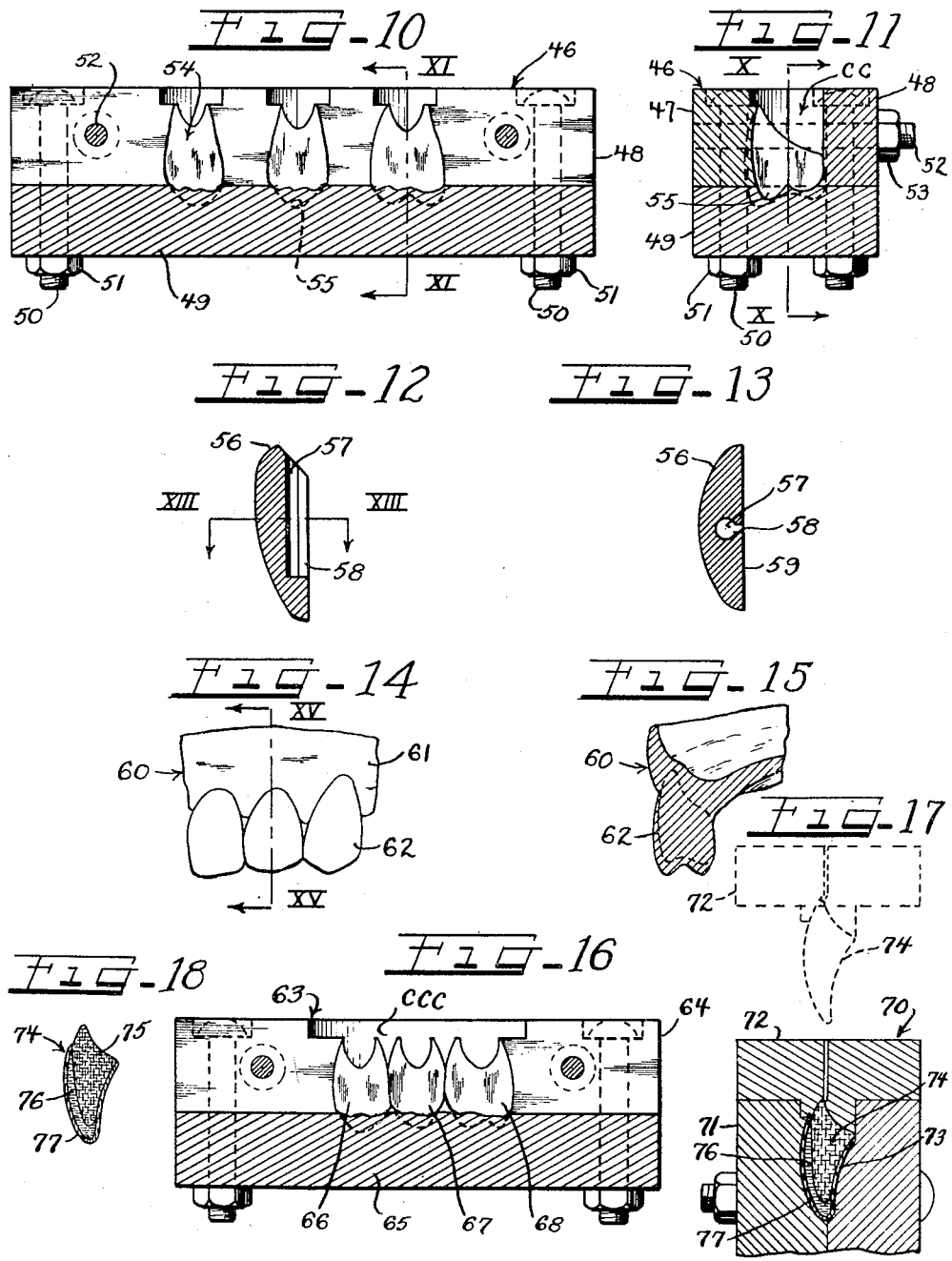

Patented July 4, 1950

2,514,075

UNITED STATES PATENT OFFICE 2,514,075

ARTIFICIAL TOOTH

Ernest Byron Kelly, Chicago, Ill., assignor to Myerson Tooth Corporation, Cambridge, Mass., a corporation of Massachusetts Application July 10, 1940, Serial No. 344,652

1 Claim. (Cl. 32—8)

This invention relates to a method of forming teeth from synthetic plastics and to teeth so made.

It has heretofore been proposed to make complete dentures from synthetic plastics. Denture base plates have been made successfully from acrylic resins for the past few years but to the best of my knowledge, no one has as yet been successful in making the teeth themselves, or tooth parts, from such resins.

Customarily, artificial teeth are made from porcelain. While porcelain teeth have many advantages, such as inertness to the juices of the oral cavity and hardness, they nevertheless have many disadvantages, such as brittleness and tendency to fracture. Porcelain teeth, furthermore, are difficult to color properly so as to resemble natural teeth.

I have now found that teeth and tooth parts, gum sections and the like, can be very effectively formed by a molding process from synthetic plastics of the thermosetting, heat polymerizable or thermoplastic type. By a two-step process, the tooth tip and face portions may be given more of a bluish-white cast than the tooth base, thereby more closely simulating the appearance of natural teeth. My invention also contemplates a more perfect blending of the differently colored tip and face portion and base portion of the tooth than has apparently been possible in making porcelain teeth.

Where extra hardness is desired in teeth formed from a synthetic resin composition, this can be accomplished by incorporating a suitable hardening filler therein, or by applying a film of harder characteristics over the surface of the tooth, as by a molding or coating step. I have found that relatively hard thermosetting resin compositions can be adherently applied to the exposed tooth surfaces without danger of separation during use.

It is therefore an important object of this invention to provide a method of making teeth from synthetic plastics whereby the coloring and general appearance of natural teeth may be closely simulated.

It is a further important object of this invention to provide a multistep molding method for the production of teeth and tooth parts from synthetic plastics, such as a methyl methacrylate resin, in the first of which steps the tip and face portion of the tooth is formed of a moldable composition having an appropriately bluish-white cast and in a subsequent of which steps the base portion of the tooth is united to the tip and face portion and blended therewith into an integral whole.

It is a further important object of this invention to provide a method for making teeth of moldable plastics involving a multi-step molding operation and a coating step to provide a suitably inert, hard wearing surface for the tooth.

It is a further important object of this invention to provide a tooth, tooth part, gum section or the like, formed of a molded synthetic plastic and so colored as to simulate closely the appearance and coloring of natural teeth.

It is a further object of this invention to provide a tooth, tooth part, gum section or the like of an acrylic resin composition of uniformly blended coloring to resemble perfect natural teeth and having a film or coating of relatively harder characteristics over the exposed or wearing surfaces thereof.

Other and further important object of this invention will be apparent from the disclosures in the specification and the accompanying drawings.

This invention (in a preferred form) is illustrated in the drawings and hereinafter more fully described.

On the drawings:

Figure 1 is a top plan view of a two-part female die member for use in molding individual teeth in accordance with the principles of my invention.

Figure 2 is an isometric view of one of the die parts as viewed along the plane of the line II—II of Fig. 1.

Figure 3 is a side elevational view of an intermediate male die member.

Figure 4 is a side elevational view of a final male die member, with a portion broken away and in section to show the construction.

Figure 5 is a broken bottom plan view of the male die member shown in Fig. 4.

Figure 6 is a sectional view taken along the line VI—VI of Fig. 1 with the tooth cavity only partially filled with a plastic material.

Figure 7 is a sectional view similar to Fig. 6 but with the intermediate male die member shown in Fig. 3 in cooperative relationship with the female die member of Fig. 1 and with the front and tip portion of the tooth being molded therein.

Figure 8 is a sectional view similar to that shown in Fig. 6 but with the intermediate male die member removed and the die cavity filled with plastic material.

Figure 9 is a sectional view similar to that of Fig. 8 but with the final male die member of Fig. 4 shown in operative position to effect the final molding of the tooth.

Figure 10 is a longitudinal sectional view, taken substantially along the line X—X of Fig. 11, of a three-part die for the casting of molars.

Figure 11 is a sectional view taken substantially along the line XI—XI of Fig. 10.

Figure 12 is a longitudinal sectional view of a tooth part, or tooth facing.

Figure 13 is a sectional view taken substantially along the line XIII—XIII of Fig. 12.

Figure 14 is a fragmentary view of a molded gum section.

Figure 15 is a sectional view taken substantially along the line XV—XV of Fig. 14.

Figure 16 is a longitudinal sectional view of a three part die suitable for use in the casting of a gum section such as shown in Figs. 14 and 15.

Figure 17 is a transverse sectional view of an over die and its associated male die member, illustrating in dotted lines the manner in which the tooth to be coated is mounted in the male die member.

Figure 18 is a sectional view of a finished tooth made in accordance with the principles of my invention.

Teeth, tooth parts, gum sections, and the like, are formed in accordance with the principles of my invention of any suitable plastic material. The plastic materials found to be suitable may be of either the thermosetting, heat polymerizable or thermoplastic type. I prefer, however, to make the body of the tooth, tooth part or gum section of an acrylic resin, such as a polymerized homolog of acrylic acid and its esters, or more specifically, of a polymerized methyl methacrylic acid ester, such as that now available for the manufacture of denture base plates. Where a methyl methacrylate type of resin is used, I may employ a mixture of a preformed polymeric mono-methacrylic acid ester and a monomeric methacrylic acid ester, in accordance with the procedure disclosed in the Strain Patent No. 2,120,006.

One of the novel features of my present invention resides in my use of a multi-step method for the molding or casting of teeth, tooth parts, gum sections and the like. In accordance with my invention, a tip and front face portion of a tooth is first formed of a suitably colored or pigmented plastic composition and then the body and base portion of the tooth is molded, preferably although not necessarily, in the same die and united with the tip and frontal face portion of the tooth to form an integral whole. In this way the coloring of a natural tooth may be most closely simulated, much more nearly so than is possible in the case of porcelain teeth.

After the tooth, tooth part, gum section or the like has been molded in the manner indicated, the exposed or wearing surfaces of the teeth may be coated with a plastic or lacquer composition of relatively harder characteristics when set or dried. The application may be made by a simple coating operation, as by dipping, immersing, spraying or brushing, or the preformed tooth or tooth part may be placed in an over die containing the surfacing composition in plastic form and this composition caused to adhere as a thin surface coating to the preformed tooth by being subjected to suitable pressure and temperature in the die.

The method of my invention will now be more specifically described in connection with the apparatus illustrated in the accompanying drawings for carrying my method into practice. It will be understood, however, that the apparatus shown is merely illustrative and is in no way intended to constitute a limitation upon my invention as to a method of forming teeth, tooth parts, gum sections and the like.

The reference numeral 20 (Figs. 1 and 6 to 9 inclusive) indicates generally a two-part female die member, which may be formed of metal or any other suitable material capable of withstanding the temperatures and pressures employed in my method. As shown, the die member 20 comprises complementary die sections 21 and 22 having plane mating surfaces, in which are formed suitably shaped cavities 23 and 24, respectively, which, when the die sections are operatively associated, constitute the tooth molding cavities. One or more of such cavities, indicated generally by the letter C may be provided in a die 20. Bolts 25 together with their associated nuts 26 serve to hold the die sections 21 and 22 together under the desired pressure.

Each of the cavities C is provided with a substantially cylindrical countersunk portion 27 whereby there is provided a segmental annular shoulder 28. Said annular shoulder 28 merges in the wall of the cavity portion 27 formed in the die section 21, but is coextensive with the semi-cylindrical opening into the cavity portion 24 of the die section 22. The function of the shoulder 28 will hereinafter more fully appear.

As is more clearly shown in the sectional views (Figs. 6 to 9 inclusive) the cavity portions 24 are contoured to the shape of the frontal face portion of the teeth to be reproduced, while the cavity portions 23 provide the proper contour for the rear portion of the teeth. The plane of division between the two die sections 21 and 22 constitutes a medial plane extending longitudinally of the teeth.

An intermediate male die 29 is illustrated in Fig. 3. Said male die 29 comprises a plate 30 from the undersurface of which projects a plurality of plungers 31 so arranged as to be movable into and out of the cavities C of the female die block 20. Each of the plungers 31 is provided with an upper collar 32 adapted to fit into a countersunk portion 27 of a cavity C and extend therein to against a shoulder 28. The shoulder 28, in cooperation with the collar 32, thus limits the extent of the entry of a plunger 31 into a cavity C.

Each of the plunger portions 31 beyond its collar 32 is so shaped that its rear face conforms with and closely fits against the corresponding wall of a cavity 23, while the front face of the plunger portion 31, although generally conforming to the contour of the corresponding wall of a cavity portion 24, is spaced therefrom to provide a clearance space 33. Said clearance space 33 extends the full length of what constitutes the front face of the tooth to be formed, clear down to and including the tooth tip portion. This is accomplished, of course, by making each of the plunger portions 31 shorter than the depth dimension of a cavity C below its shoulder 28. The ends of the plunger portions 31 may be squared off and slightly rounded at their edges, as at 34.

A final male die member 35 (Figs. 4 and 5) comprises a plate 36 provided on its under surface with plungers 37. Each of said plungers 37 is formed with an upper collar 38, from the rear portion of which extends a relatively short plunger portion 39. Said portion 39 has a convex forward face 40 (Fig. 9), which with the forward part of the shoulder portion 38 forms a reentrant recess 41. A capillary relief vent 42 may be provided, if necessary, through the plate 36 from the top of the reentrant recess 41, so as to prevent the entrapment of air or gases within the cavity C. Numbers 43, or other suitable identifying indicia, may be formed in the face 40 of each recess 41 for reproduction on the exposed gingival end surface of the tooth case therein. In this way each tooth is readily identified and may be called for from stock by number.

The technique of making the die parts just described forms no necessary part of my present invention. In general, however, it is entirely practical to form the cavities C of the die of the same size, shape and contour of the natural tooth, or model, that is to be reproduced. This is not possible in the case of porcelain teeth, since porcelain teeth, after being formed, have to be baked or fired, and there is a considerable resulting shrinkage. Consequently, it is very difficult, if not impossible from a practical standpoint, to reproduce a natural tooth or model in porcelain with entire faithfulness as to dimensions.

The process with which the die illustrated in Figs. 1 to 9 inclusive is used, will now be described.

As previously stated, various plastic compositions can be used in forming the teeth, tooth part, gum sections or the like of my invention. Mention may be made of the various known types of plastics, such as the cellulosic derivatives, particularly cellulose acetate, the phenolic condensation products, urea condensation products, and polymers of the vinyl, styrene and acrylic type, the monomer of which is characterized by the presence of the unsaturated radical

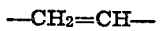
—CH$_2$=CH—

In general, plastics of either the thermosetting, heat polymerizable or thermoplastic type may be employed, but I prefer to use as the main plastic for forming the teeth, the so-called acrylic resins and particularly those disclosed in the Tidd U. S. Patent 2,013,295.

As the base for my molding composition, I prefer to use a mixture of a polymeric monomethacrylic acid ester and of a monomeric methacrylic acid ester. Suitable examples of the so-called "polymer" and "monomer" are to be found in the disclosure of the Strain Patent No. 2,120,006. As that patent teaches, the monomer sereves as a fugitive plasticizer for the polymer, and during the molding step is itself polymerized under the action of the heat employed.

In accordance with my preferred method, differently colored or pigmented plastic compositions are used in making a tooth. For instance, the tip and face portion of the tooth may be formed of a composition having a bluish white cast, when set, while the base or body portion of the tooth may be formed of a composition having a slightly yellowish cast. The desired amount of blending occurs as a result of the flow of the plastic composition during the molding operation, with the result that artificial teeth can be made in accordance with my process that equal in appearance and coloring the most perfect natural teeth.

As an example of a suitable plastic composition of the acrylic acid type, the following formula is given:

1 cc. monomeric methacrylate (liquid)
35 gr. acrylic resin polymer
0 to 75 volume percent ethylene dichloride (by volume of the monomer)

In preparing the composition for the tip and front face portion of a tooth, it is preferable to use about one-half as much of the solvent, such as ethylene dichloride, by volume of the monomer used. Other solvents, such as an ethyl methyl ketone, ethyl acetate and other chlorine derivatives of the hydrocarbons may be used, or no solvent need be employed. The plastic composition is preferably of a putty-like consistency when at room temperature.

The desired coloring or pigmenting of the composition is accomplished by the addition of suitable oxides or sulfides, or mixtures of oxides and sulfides of various metals. Titanium dioxide and tin oxide may be used for imparting a white color to the composition, while for a blue, one may use a cobalt oxide, and for a yellow, one may use cadmium sulfide. Aniline colors and vegetable dyes may also be used, but the dyes or pigments employed should, of course, be only those that are harmless and non-toxic.

In making up a plastic molding composition of the acrylic resin type, I prefer to make up a separate working base composition for the tip and front portion of the tooth, from that for the body of the tooth.

For example, the working base for the tip and face tooth portion is prepared as follows:

Mixture A:
    1000 gr. of polymer (clear crystals or powder)
    10 gr. of cryolite (Greenland spar)
    0.125 gr. of cobalt blue Equal parts of this mixture A and of clear polymer are then mixed together to constitute the working base, and further pigments added, if necessary, to give the particular shade or cast desired in the finished tip and front face portion of the tooth. For instance, a trace of titanium dioxide may be added to give a more nearly dead white color. The titanium dioxide, or mixtures of titanium dioxide with calcium or barium sulfate, has approximately ten times the pigmentation value of cryolite, and may be substituted in whole or in part for cryolite on this basis.

In making up the plastic molding composition for the tip and front face tooth portion, 35 gr. of the working base are moistened with 1 cc. of the monomer and a sufficient quantity of a solvent, if necessary, to give a putty-like consistency.

For the body of the tooth, a working base is prepared as follows:

Mixture A:
    1000 gr. polymer
    1 gr. yellow oxide (cadmium sulfide)

Working base:
    200 gr. of A
    1000 gr. of polymer
    0.5 gr. of titanium dioxide As before, 35 gr. of the working base are moistened with 1 cc. of the monomer. Usually a small quantity of solvent, say 0.25 to 0.5 cc., will be mixed in, but the solvent is not essential.

It will be understood that in making larger quantities of the plastic composition, somewhat the same proportions as given above will be employed, but the procedure may be varied considerably. In any event the percentage by weight of pigment or coloring matter in the finished tooth is very small in comparison with the weight of the resin, probably of the order of from 0.01 to 1%. Aniline or vegetable dyes that are soluble in the liquid monomer can be added to the monomer to give the desired color to the finished teeth, but, in general, pigments give a more natural, or lifelike, appearance to the teeth.

The plastic compositions from which the base and body portion 75 of the tooth is formed may include a substantial proportion of a filler, say up to 20%, and preferably from 3 to 5% by weight of the composition. Fillers that impart hardness to the composition are preferred, such as finely divided silica, glass powder, or relatively short fibers or asbestos, fiber glass or rock wool. The harder thermosetting resins, such as the phenol condensation products, can be physically dispersed in finely divided form throughout the plastic composition to impart hardness thereto.

In carrying out the molding operation with a die such as shown in Figs. 1 to 9 inclusive, a sufficient mass 44 of the plastic composition to form the tip and face portion of a tooth is introduced into a cavity C (Fig. 6). The plastic composition may be at ordinary room temperature when introduced into the die. The male die 29 is then brought into operative association, as illustrated in Fig. 7, so as to spread the plastic mass 44 into the clearance space 33, which serves to form the tip and front face portion of the tooth. With the die assembled as shown, the plastic composition 44 is subjected to a pressure of between 200 and 3000 lbs. per sq. in. and to a temperature of between 200 and 400° F. The required temperature can be readily attained either by immersing the die as a whole into a heated liquid bath, such as a bath of glycerine, or the die may be transferred to an oven, or it may be electrically heated. A temperature of around 260° F. is usually ample for the molding operation.

During the molding operations, the monomer is caused to polymerize and the solvent, if any be present, is driven off. The mass 44 of plastic composition is thus caused to set into the form and shape provided for it by the clearance space 33. It is not necessary, or even desirable, that a complete set of the plastic composition 44 be effected, but a sufficient amount of set should take place so that the mass 44 will retain its form and shape and hold its position within the cavity C after the withdrawal of the plunger 31 of the male die 29. The fact that the clearance space 33 is undercut with respect to the more constricted entrance into the die cavity aids in causing the retention of the mass 44 in said clearance space as the plunger 31 is withdrawn.

After the male die 29 has been withdrawn, a plastic mass 45 (Fig. 8) is introduced into the cavity C until the cavity is practically filled up to the shoulder 28. Said plastic mass 45 may be of a similar composition to that above described for the body portion of the tooth, but preferably less liquid is used in compounding the plastic mass for the body, or base, portion of the tooth. An amount of ethylene dichloride, or other solvent only sufficient to soften the crystals of the polymer need be used, or the ethylene dichloride may be omitted entirely. As previously explained, pigments or coloring may be incorporated into the plastic composition for the base or body portion of the tooth to give it a more yellowish cast than that of the plastic mass 44.

The male die 35 is then brought into its associated relationship with the die part 20, as illustrated in Fig. 9, and the molding of the plastic mass carried out under the same temperature and pressure conditions as above given. The vent 42 in the male die member 35 prevents the entrapment of air or gases within the reentrant recess 41. During this final molding step, a certain amount of blending takes place between the two masses 44 and 45, with the result that a uniformly colored, integral tooth is obtained. The time required for each molding step is from 5 to 20 minutes, with an overall time for the complete cycle of around 20 minutes to an hour.

After the die has been cooled, the molded tooth is removed from the female die by loosening the nuts 26 and withdrawing the bolts 25. Since the coefficient of expansion of the plastic material constituting the tooth is very low, the finished tooth, as removed from the die, constitutes a faithful reproduction as to size, shape and contour, of the model from which the cavity C was formed. As previously pointed out, the convex face 40 of the final male die 35 determines the contour of the gingival end of the finished molded tooth. Said gingival end is thus left exposed for direct union with a denture plate. Should it be necessary later on to change the shape of the tooth, or to repair a tooth formed from an acrylic resin as described, it is always possible to do so by subjecting the tooth again to heat and pressure within a proper mold or die.

Teeth formed from an acrylic resin in accordance with the process described are practically unbreakable, even when subjected to the most extreme conditions of normal use and handling and are non-shatterable. They have the further advantage of lightness, toughness, resiliency without being too soft or rubbery, and high resistance to impact. Since acrylic resins are relatively poor conductors of heat and electricity, the use of teeth or dentures formed therefrom is not likely to give rise to any shock from either of those sources. As will later be described, if the teeth are not sufficiently hard for use in permanent dentures, a coating of a plastic of harder characteristics when set can be applied over the exposed surfaces of the tooth. In general, this is not necessary for immediate dentures. Immediate dentures are made from molds cast directly from the natural teeth and may be used temporarily.

In Figs. 10 and 11 there is illustrated a three part female die for use in the molding of bicuspid and molar teeth. The shape and contour of the bicuspid and molar teeth are such that it is necessary to employ a multi-part female die divided along two planes at right angles to each other. A suitable form of multi-part female die, indicated generally by the reference numeral 46, comprises a pair of upper die parts 47 and 48 having mating faces abutting each other in a vertical plane, and a lower die part 49 having a horizontal face for mating with the lower horizontal faces of the upper die parts 47 and 48. The die parts are held in place by means of vertically exwith, and by horizontally extending bolts 52 having nuts 53 associated therewith.

The vertical mating faces of the upper die parts 47 and 48 are provided with one or more tooth-like recesses 54, which when the die parts are mated together, form the molding cavities CC. The bottom portions 55 of said molding cavities CC are provided in the lower die part 49. By this arrangement of multi-part dies, the die parts may be readily separated for the removal of the molded teeth, the bottom die part 49 being first released and separated from the upper die parts 47, 48 and then the upper die parts separated from each other.

The male die member for use with the female die 46 is not shown, but may, in general, be similar to that illustrated in Figs. 4 and 5. In the case of molar or bicuspid teeth, there is no particular advantage in forming the teeth in two molding steps, as was described above. It would, however, be entirely feasible to employ a two-step molding process for the bicuspid and molar teeth and in that case an intermediate die, similar to the die 29 (Fig. 3) could be used.

Figs. 12 and 13 illustrate a tooth part, indicated generally by the reference numeral 56, which may be formed from an acrylic resin composition by a method similar to that described in connection with the forming of full teeth. The tooth part 56 is of a usual form for a tooth facing and is provided with a longitudinally extending cylindrical recess 57 having a relatively narrower entrance recess 58 the full length thereof along the back face 59 of the tooth part. A peg or post (not shown) serves for mounting the tooth facing 56 in place on the denture, or on a crown or bridge.

A gum section 60 is illustrated in Figs. 14 and 15. Said gum section 60, comprising the gum portion 61 and the plurality of teeth 62 associated therewith, may be formed as an integral whole in a suitably shaped die by the same method as has already been described. The gum portion 61 may be colored pink, or flesh colored in accordance with my two-step molding method.

A suitable female die, indicated generally by the reference numeral 63 (Fig. 16) comprises a pair of upper dies 64 and a lower die 65. The upper die parts 64, of which only one is shown, are provided with mating tooth-shaped recesses, which together form a multi-tooth cavity CCC. In this cavity, the individual tooth recesses, such as the recesses 66, 67 and 68, are in communication with each other along their adjacent proximal edges, so that the teeth formed therein, similar to the teeth 62, are slightly joined along their proximal edges.

As previously mentioned, it may be desirable to apply to a tooth, formed as herein described, an outer coating that is relatively harder and more wear resistant than is provided by the plastic composition constituting the body of the tooth. In that case, a plastic composition having the desired degree of hardness, when set, is applied over the exposed or wearing surfaces of the tooth. This may be accomplished by simple immersion or dipping of the tooth into a liquid bath of a partial condensation product, a partially polymerized resin, or the like, or such a liquid may be sprayed, brushed or otherwise applied over the surface of the tooth. Preferably, however, a thin outer film or coating is applied to the tooth by a molding operation within an over die, that is, a die slightly larger in dimensions than the die in which the tooth was originally molded.

Such an over die, indicated generally by the reference numeral 70, is illustrated in Fig. 17. Said over die 70 comprises a two-part female die 71 and an upper male die 72. A sufficient quantity of the coating composition, indicated by the reference numeral 73, is placed within the tooth cavity of the female die 71 and the male die part 72, carrying the tooth 74 to be coated is brought into mating relationship. The coating composition 73 is thus spread as a thin uniform film over the exposed or wearing surfaces of the tooth 74 and this film is molded under suitable pressure and temperature conditions to form an integral part of the body of the tooth.

The finished tooth (Fig. 18) thus comprises a body or base portion 75, a tip and front face portion 76 and a continuous, thin outer film 77 covering the entire exposed surface of the tooth. The outer film 77 may be transparent and colorless, or it may be pigmented or colored in the same manner as the tip and front face portion 76.

Suitable plastic compositions for use in forming the outer film 77 include the harder types of resins, or plastics, such as those prepared from poly styrenes, phenol-formaldehyde condensation products, urea-formaldehyde condensation products and the like.

I have found it very satisfactory to dip a tooth in a soluble type of a phenol condensation product, such as "Catalin," and then allow the coated tooth to stand at 110° F., or thereabouts, to set the resin. Baking the resinous coating gives even better results.

It is also possible to use fossil resins, such as copal, or kauri, especially a heat-treated, or "cracked" fossil resin dissolved in a drying oil, such as tung oil, to form a lacquer and apply the lacquer to the tooth and allow it to dry thereon to form the film 77.

Although this invention has been described particularly in connection with the use of methacrylate resins as the plastic base, other resins, such as above named, may be substituted in part or in whole for the methacrylate resins. From the standpoint of ease of repair, it is preferable, of course, to use a thermoplastic type of resin, since such resins can be softened under the application of heat and remolded, or resurfaced.

Stock teeth can be cast, or molded, in the manner herein described, or a partial or full complement of teeth can be molded in one operation. It is also possible to employ what is known as injection molding instead of the molding method herein described. In that case the polymer alone might be used under sufficient heat to render it fluid. Whatever method is used, however, it will be found preferable to carry out the molding operation in a sequence of steps, such as those herein described, whereby the tip and front face portion of a tooth may be differently colored or tinted from the base and body portion of the tooth.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

As an article of manufacture, a composite artificial tooth comprising a body portion of a synthetic thermoplastic composition and an outer exposed portion of a relatively harder and more wear-resistant polystyrene plastic composition, said body and outer exposed portions being integrally united.

ERNEST BYRON KELLY.

REFERENCES CITED

The following references are of record in the file of this patent:

UNITED STATES PATENTS

| Number | Name | Date |
|---|---|---|
| 589,382 | Dennett | Aug. 31, 1897 |
| 1,384,282 | Tuttle | July 12, 1921 |
| 1,392,174 | Kempton | Sept. 27, 1921 |
| 1,454,939 | Michaelsen | May 15, 1923 |
| 1,511,458 | Gibson | Oct. 14, 1924 |
| 1,547,643 | Clapp | July 28, 1925 |
| 1,599,085 | Gibson | Sept. 7, 1926 |
| 1,839,699 | Parkhurst | Jan. 5, 1932 |
| 2,013,295 | Tidd | Sept. 3, 1935 |
| 2,120,006 | Strain | June 7, 1938 |
| 2,163,014 | Voigt | June 20, 1939 |
| 2,202,712 | Myerson | May 28, 1940 |
| 2,202,713 | Myerson | May 28, 1940 |
| 2,230,164 | Myerson | Jan. 28, 1941 |
| 2,419,084 | Meyerson | Apr. 14, 1947 |

FOREIGN PATENTS

| Number | Country | Date |
|---|---|---|
| 823,510 | France | Oct. 18, 1937 |

OTHER REFERENCES

J. H. Prothero: "Prosthetic Dentistry," 3rd edition, 1923, published by Medico-Dental Publishing Co., Chicago, pp. 426, 535, 537.

Article by G. Ehlers, "Applications of Synthetic Resins," Kunststoffe, April 1938, volume 28, No. 4, pages 96–97.